(12) United States Patent
Dotson et al.

(10) Patent No.: US 7,972,088 B2
(45) Date of Patent: Jul. 5, 2011

(54) CONVEYOR FOR A PREPARATION MACHINE USED TO ORIENT OBJECTS

(75) Inventors: Sean Dotson, Sarasota, FL (US); Bill Klawonn, Octeville sur Mer (FR); Mina Klawonn, legal representative, Bradenton, FL (US); Stéphane Lorange, Octeville sur Mer (FR); Samuel Mathis, Octeville sur Mer (FR); Doug Robertson, Sarasota, FL (US); Emmanuel Roth, Octeville sur Mer (FR); Gilles Waeldin, Octeville sur Mer (FR); Curtis Welter, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 530 days.

(21) Appl. No.: 11/666,092

(22) PCT Filed: Oct. 21, 2005

(86) PCT No.: PCT/FR2005/002615
§ 371 (c)(1),
(2), (4) Date: Jun. 12, 2008

(87) PCT Pub. No.: WO2006/045928
PCT Pub. Date: May 4, 2006

(65) Prior Publication Data
US 2009/0166153 A1 Jul. 2, 2009

(30) Foreign Application Priority Data
Oct. 25, 2004 (FR) ...................................... 04 11336

(51) Int. Cl.
*B65G 53/44* (2006.01)

(52) U.S. Cl. ....... 406/79; 406/88; 198/397.03; 198/453; 198/457.01

(58) Field of Classification Search ............. 198/397.06, 198/397.03, 453, 457.01; 406/78–81, 88, 406/144
See application file for complete search history.

(56) References Cited

U.S. PATENT DOCUMENTS
2,954,862 A * 10/1960 Clark ............................ 198/443
(Continued)

FOREIGN PATENT DOCUMENTS
EP    0 699 605 A    3/1996
(Continued)

OTHER PUBLICATIONS
Japanese Office Action dated Aug. 10, 2010, with English translation.
(Continued)

*Primary Examiner* — Joe Dillon, Jr.
(74) *Attorney, Agent, or Firm* — Sughrue Mion, PLLC (57) ABSTRACT

A conveyor which can be used to route oriented objects, such as caps, covers, lids, etc. from a finishing machine of the type including a belt, a vibrating bowl or other. The conveyor includes a module having a vertical conveyor in the form of a column with an adjustable height and an intermediate conveyor in the form of a casing which is disposed between the finishing machine and the column. In addition, the module includes channel-type devices for guiding the objects and devices for propelling the objects, in the form of jets of air pulsed through eyes. The channel and the eyes form a continuous assembly between the finishing machine and the upper end of the column. The conveyor also includes devices enabling the automatic ejection of objects from grooves provided in the belt of the machine.

21 Claims, 3 Drawing Sheets

U.S. PATENT DOCUMENTS

| | | | |
|---|---|---|---|
| 3,105,720 A * | 10/1963 | Barker | 406/88 |
| 3,210,130 A * | 10/1965 | Kelly | 406/153 |
| 3,924,732 A * | 12/1975 | Leonard | 198/404 |
| 4,006,812 A * | 2/1977 | Everett et al. | 198/347.1 |
| 4,104,966 A * | 8/1978 | Ackley et al. | 101/40 |
| 4,275,976 A * | 6/1981 | Sticht | 406/28 |
| 4,735,343 A * | 4/1988 | Herzog | 221/159 |
| 4,741,428 A * | 5/1988 | Taniguchi et al. | 198/397.04 |
| 5,394,972 A * | 3/1995 | Aidlin et al. | 198/393 |
| 5,439,093 A * | 8/1995 | Drewitz | 198/399 |
| 5,501,553 A * | 3/1996 | Simkowski | 406/88 |
| 5,549,423 A * | 8/1996 | Lenhart | 406/86 |
| 5,586,637 A * | 12/1996 | Aidlin et al. | 198/397.06 |
| 5,842,818 A * | 12/1998 | Simkowski | 406/88 |
| RE37,532 E * | 1/2002 | Lenhart | 406/86 |
| 6,494,646 B1 * | 12/2002 | Sala | 406/88 |
| 6,533,504 B1 * | 3/2003 | Tye | 406/93 |
| 6,823,752 B2 * | 11/2004 | Kimura et al. | 73/865.8 |
| 6,843,367 B1 * | 1/2005 | Gentile et al. | 198/861.1 |
| 7,040,489 B2 * | 5/2006 | Zemlin et al. | 209/691 |
| 7,223,060 B2 * | 5/2007 | Weidenmuller | 414/676 |
| 7,553,110 B2 * | 6/2009 | Minami et al. | 406/75 |

FOREIGN PATENT DOCUMENTS

| | | |
|---|---|---|
| JP | 46-009982 | 4/1971 |
| JP | 05-097241 A | 4/1993 |

OTHER PUBLICATIONS

"Sidel's Cap Feeder turns feeding closures and caps into a source of productivity," Sidel News, Nov. 2002, No. 15.

* cited by examiner

CONVEYOR FOR A PREPARATION MACHINE USED TO ORIENT OBJECTS

This Application is a National Stage Entry under 35 U.S.C. §371 of PCT Application PCT/FR2005/002615, filed Oct. 21, 2005, and which claims priority from French Application 04/11,336, filed Oct. 25, 2004. The disclosures of these documents are hereby incorporated by reference.

The present invention relates to a conveyor associated with a preparation machine used to orientate objects and, more particularly, to a conveyor device which routes objects of the closure, lid, cap, etc. type as they leave a preparation machine.

The present invention also relates to preparation machines equipped with this routing device.

These preparation machines, commonly known as cap feeders, receive the objects in loose form and, through appropriate means, automatically manipulate these objects in such a way as to orientate them all the same way after which these orientated objects such as caps for example are conveyed to a station where they are used.

The problems encountered in such machines, as detailed hereinafter, relate essentially to cap feeders which prepare caps with a view to using them in bottling lines and plants; hence, in the remainder of the description and in order to simplify matters, the discussion will essentially center around caps and bottling without this being interpreted as any restriction on the scope of the present invention.

These preparation machines need to be regularly supplied with caps for orientating. They need to be able to be approached by an operator and/or by appropriate means so that their hopper can be loaded with loose caps.

Nor must their location on the bottling site cause difficulties or complications in performing simple maintenance operations or any other work, or be a source of disturbance to the site itself by generating dust or the like which could degrade the content of the bottles.

Indeed, it is not rare for some of such machines, for example preparation machines of the vibrating bowl type, to be found installed above the bottling station, so as to limit or even eliminate any conveying system between said machines and the station where the orientated caps are used; however, this type of machine and this type of installation exacerbate the aforementioned difficulties and disadvantages.

Preparation machines of the vertical endless belt type are usually installed on the ground because they are able, in addition to sorting and orientating the caps, by virtue of their belt, to perform at least part of the conveying of said orientated caps, raising them to a certain height as required. This conveying is in fact performed by means of their preparation belt which rises vertically to a variable height chosen according to the installation and the siting of the machine.

For this type of preparation machine, the belt comprises cleats which pick up the caps from the machine hopper into which they are tipped loose. The caps are extracted from the hopper by the movement of the belt and become housed in grooves delimited by said belt and the cleats.

The belt is formed and guided in such a way as to automatically eject the caps which are incorrectly orientated, which incorrectly orientated caps drop quite simply back into the hopper. Thereafter, the remaining caps, that is to say those which are correctly orientated, are extracted from the grooves in the belt and conveyed to the bottling station, by appropriate means which make the connection between the site of the preparation machine and said bottling station.

The cost of these belt-type preparation machines is relatively high because in particular of the cost of their belt which rises with the level at which the caps orientated by said belt are delivered.

The present invention proposes equipment which is advantageous from various standpoints for these preparation machines of the belt, vibrating bowl, etc. type and also for machines of the centrifugal type.

This equipment affords improvements regarding the surroundings of the bottling stations and in particular, particularly in respect of machines of the vibrating bowl type, eliminates the source of dust which is very often placed directly above said bottling stations.

The invention also makes it possible to reduce, or even eliminate the constraints regarding the siting of this equipment on the site, by virtue of fresh possibilities offered by the conveyor device in respect of connection of the preparation machine to the station that uses the orientated caps, that is to say the bottling station.

The fresh possibilities in terms of siting also make it possible to conceive of improvements with regard to access to these preparation machines both for supplying them with objects and for maintaining them or performing any other intervention.

The present invention also proposes, by way of a product, a preparation machine which, in addition to its prime function, namely that of orientating the caps, performs another function which is to carry out all or some of the routing of these orientated caps to the bottling station for example.

According to the invention, the conveyor device is in the form of a module which consists, on the one hand, of a vertical conveyor in the form of a column, the height of which is adjustable, and, on the other hand, of an intermediate conveyor in the form of a box section interposed between the preparation machine and said column, which module comprises, in general, means in the form of a duct for guiding said orientated caps and means for propelling the latter in the form of jets of blown fluid, which jets are generated by nozzles in the form of louvers arranged on at least one of the walls of said duct, which louvers communicate with the chamber of said box section, and of said column, which chambers are supplied with pressurized fluid, air for example, by means of the blower kind, and the assembly consisting of the duct and the louvers of said module forms a continuation running between said preparation machine and the upper end of said column.

According to one particular provision of the invention, the intermediate conveyor in the form of a box section comprises a duct for guiding the orientated caps and at least one row of louvers for driving them and this duct/row-of-louvers assembly is in the shape of a curve, like an arc of a circle, between the preparation-machine-side inlet and the outlet which lies under and in the continuation of the duct of the column forming the vertical conveyor.

According to another provision of the invention, the duct of the box section has a width which exceeds that of the duct of the column, which duct of said box section and its inlet can have a width which corresponds to several times the diameter of the caps, at least twice their diameter, which duct consists of a wall comprising the louvers, of another wall spaced away from said wall comprising the louvers by a distance which corresponds to the thickness of said caps, of an extrados guide which runs between said inlet and the outlet of said box section and an intrados guide, the ends of which are sufficiently distanced from said inlet and from said outlet; that it is possible for the orientated caps which have not managed to enter the succession of caps which are guided by the extrados to be recycled.

Still according to the invention, the downstream end of the duct of the box section is in the form of a neck delimited by the end of the extrados guide and by a wedge-shaped separation device, which wedge comprises, as a ridge, a microroller, the purpose of which is to move aside those caps which are not in the succession guided by the extrados and to recycle them by causing them to pass around the intrados guide, which intrados guide is supplemented by a wall so as to form a kind of central island in the box section around which said caps for recycling circulate.

According to an alternative embodiment of the invention, the inlet of the conveying duct of the box section may be in the shape of a Vee, the opening of which is directed toward the downstream edge of the belt, and is designed to receive the orientated caps as they are ejected from said belt, which opening has a dimension shorter than twice the diameter of the orientated caps.

Again according to the invention, the conveyor device comprises associated means which allow the caps to be ejected automatically from their grooves in the belt of the preparation machine.

According to a first embodiment, automatic ejection of the orientated caps is performed by means of nozzles situated on the upstream side of the belt, on the opposite side to the inlet to the box section with respect to said belt and facing said inlet to said box section, which nozzles are supplied with a stream of pressurized fluid, for example air, which is pressurized by an appropriate blower of the high-pressure type and blow into the grooves of the belt, which grooves are closed off by an extension of the wall of the box section which covers the one that is equipped with the louvers, which wall extends over several of said grooves and in particular over a height which corresponds at least to the height over which said caps are blown.

According to an alternative embodiment of the invention, the means for automatically ejecting the caps consist of a continuation of the box section and, in particular, of a continuation of its blowing wall equipped with the louvers which extends over the belt of the preparation machine and covers its upper part, which wall covers and closes off the grooves of said belt and comprises louvers which blow on said caps positioned in said grooves and drive them into the duct of said box section.

Again according to the invention, the column of the conveying module consists of sections, the length of which is chosen to allow its height to be readily adapted to suit installation constraints on the site of the preparation machine, which length is, for example, of the order of 60 cm.

Again according to the invention, the column of the module comprises a duct consisting of an apron equipped with the louvers which are arranged in one or more rows, of two lateral guides and of a guide parallel to said wall, which guides are borne by brackets uniformly distributed over the column and comprise means that allow the position of said guides to be adjusted at will.

According to an alternative embodiment, the duct of the column is fashioned directly in the apron which bears the louvers, which duct comprises, on the one hand, obtained by bending, a bottom and side walls and, on the other hand, a guide parallel to said bottom, which guide is borne by brackets which allow its position to be adjusted relative to said bottom, which louvers are arranged in said side walls of said duct.

According to another provision of the invention, the means for supplying the chambers of the conveying module with pressurized air consist of at least one blower, the throughput of which is tailored to the number of louvers to be supplied and to the pressure to be maintained in said chambers, which pressure is of the order of 1500 Pa.

Again according to the invention, the box section of the module comprises arrangements grafting it onto the preparation machine and supporting the column, and arrangements for accommodating the outlet of the blower and receiving the blown air from said blower.

Again in the case of a preparation machine of the belt type and according to the speed of travel of said belt, that wall of the box section which is equipped with the louvers and which covers said belt may comprise several rows of louvers and, in particular:
- at least one main row of louvers for ejecting and conveying the caps, which extends over the entire length of said wall;
- at least one additional row of louvers situated above said main ejection row or rows and which extends over the entire width of said belt;
- at least one additional row of louvers which is situated under said main ejection row or rows and extends also over the entire width of said belt to gather said caps back together and force them to regroup at the downstream edge of said belt.

According to another provision of the invention, the wall of the box section which extends over the belt may be extended laterally, upstream of the grooves of the belt, which lateral extension may also comprise louvers which allow the stream of air to act more effectively on the caps positioned at this upstream end of said grooves.

According to another provision of the invention, the blower used to supply the louvers with blown air is positioned on the preparation machine side, under the box section of the intermediate conveyor.

According to an alternative embodiment, in the case of a preparation machine of the belt type, the blower is arranged directly on the box section which covers the belt and lies within the footprint of said preparation machine and, in particular, within the footprint of its belt.

Again according to the invention, the box section may comprise, at its upstream part, opposite the duct, a conveyor portion of the same kind as the vertical column, designed to, in certain configurations, provide the junction with the preparation machine.

According to an alternative embodiment, again for particular configurations, the box section may be equipped with an orifice at its upper part, vertically aligned with the inlet of its duct, to accept objects dropping simply under gravity from a preparation machine, which machine is connected to and associated with said box section by means of a duct which maintains the orientation of said objects.

The invention also relates to the preparation machine which comprises a conveying device as detailed hereinabove or which is associated with this conveying device, and this assembly consisting of the preparation machine and of the conveying device forms an actual product that can be incorporated into a bottling line.

The invention will be further detailed with the aid of the following description and of the attached drawings given by way of indication and in which.

Figures 1, 2, 5, 6, 7:
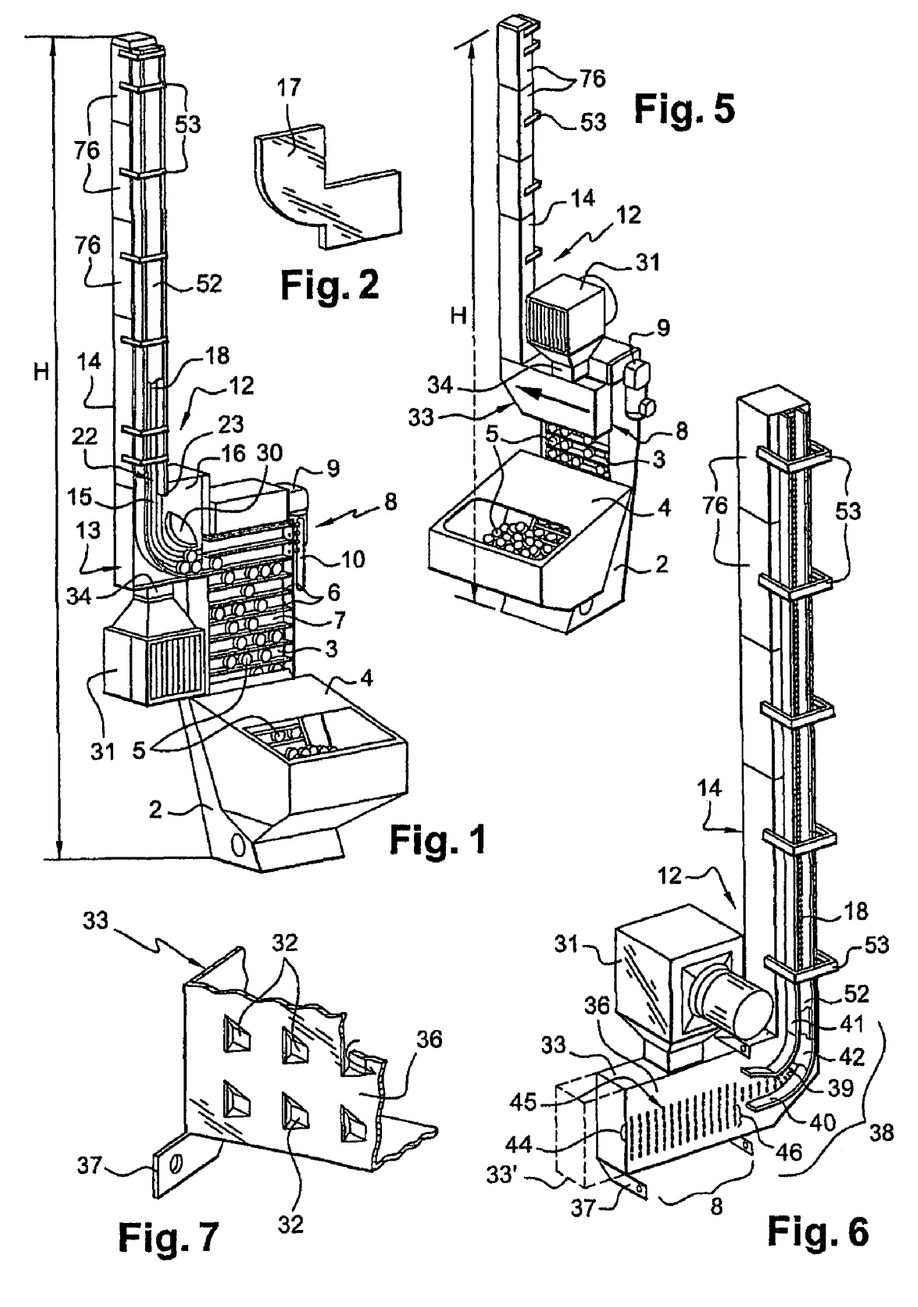
FIG. 1 shows a preparation machine of the endless vertical belt type equipped with the conveyor device according to the invention.
FIG. 2 shows the wall covering the box section of the preparation machine depicted in FIG. 1, which wall is extended over the belt to cover and close off the grooves of said belt.
FIG. 5 depicts an alternative embodiment of the conveyor device, again for a preparation machine of the endless vertical belt type.
FIG. 6 depicts, in isolation, the conveyor device of the preparation machine of FIG. 5, to a larger scale than in said FIG. 5, viewed from the blowing louvers side.
FIG. 7 depicts, to a larger scale, the details of the bottom right-hand part of FIG. 6.

The preparation machine depicted in FIGS. 1 and 5 comprises a stand (1) which bears, on the one hand, a vertical structure (2) acting as a guide for an endless belt (3) and, on the other hand, a hopper (4) into which caps (5) are tipped loose. These caps (5) are picked up automatically from the hopper (4) by means of the belt (3) of the cleated (6) belt type and become housed in the grooves (7) of said belt (3) between said cleats (6). The belt (3) is guided vertically in the structure (2) to elevate the caps (5) between the hopper (4) and the zone referenced (8) where they are ejected, at the top of the preparation machine.

Between the hopper (4) and the ejection zone (8), the caps (5) are subjected to a sorting operation to eliminate incorrectly orientated caps. The correctly orientated caps (5) appear above the hopper (4), between this hopper (4) and the ejection zone (8) where they are ejected from the grooves (7) of the belt (3).

The belt (3) is set in motion by a gear motor unit (9) which is located at the upper part of the structure (2) of the preparation machine.

The system for ejecting the correctly orientated caps (5) comprises a collection of means which allow continuous pressure to be exerted on said caps. This pressure is exerted by blown air which is ducted and directed in such a way as to cause the caps to move along sideways as detailed hereinbelow.

The preparation machine depicted in FIG. 1 comprises an ejection system consisting of a linear array of nozzles (10) which are arranged on one of the sides of the belt (3), which side corresponds to the upstream end of the grooves (7). These nozzles (10) are supplied with pressurized fluid, compressed air for example, either via a network that already exists on the site on which the machine is installed, or by an appropriate blower of the high-pressure type, not depicted, associated with said machine.

The nozzles (10) act upon the caps (5) which are housed in the grooves (7), between the cleats (6), and drive these caps (5) toward the downstream end of the belt (3) where they are taken up by a conveying module (12).

This module (12) comprises an intermediate conveyor in the form of a box section (13) which makes the junction between the structure (2) of the preparation, machine and a routing conveyor in the form of a column (14), which column has the function of delivering the caps (5) to a precise level from where they continue, simply under gravity or in some other way, via means which have not been depicted, toward the bottling station.

The box section (13) and the column (14) comprise a duct for guiding the caps (5) between the moment they are ejected from their grooves (7) in the belt (3) and the moment they are delivered to the upper part of said column (14).

In the box section (13), the duct (15) is curved, in the form of an arc of a circle, to make the link between the grooves (7) in the belt (3), which are horizontal, and the column (14), which is vertical.

This duct (15) comprises a wall (16), the surface of which lies in the continuation of that of the belt (3). It also comprises a wall (17) which is parallel to the wall (16). This wall (17) is depicted separately in FIG. 2; it in fact extends, in one piece, both over all or part of the wall (16) of the box section (13) and over the belt (3). On this belt (3), the wall (17) closes the grooves (7) in order, here again, to form a kind of duct or tunnel facing the nozzles (10). The height of this wall (17) on the belt (3) is in proportion to the size of the blowing zone of the nozzles (10); this height corresponds at least to the size of three grooves (7).

The wall (17) which covers both the box section (13) and the belt (3) is preferably made of a translucent material so as to allow the progress of the cap ejection operation and the conveying of said caps to be monitored from a distance.

The walls (16) and (17) are separated by a distance which corresponds to the thickness of the caps (5); they establish a continuous path for guiding the caps (5) when they leave their grooves (7), driven by the stream of air from the nozzles (10) which are situated at the upstream end of said wall (17).

The duct (18) of the column (14) also comprises guide walls which lie in the continuation of those of the duct (15) of the box section (13), which walls will be detailed later in conjunction with FIGS. 8 and 9 in which said column (14) is depicted in section.

Figures 3, 4, 12, 13:
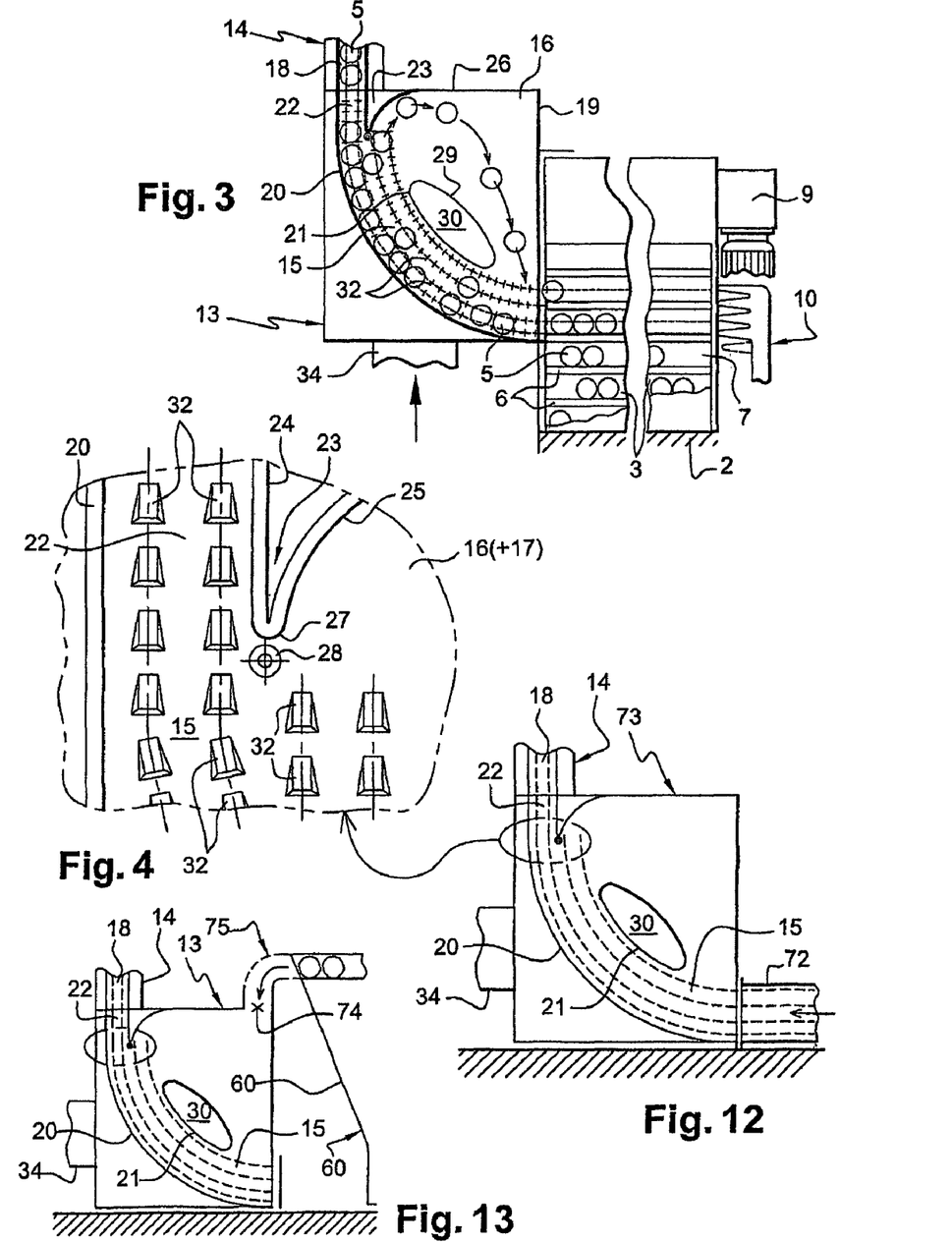
FIG. 3 depicts, in greater detail, the box section and the way it fits laterally onto the preparation machine depicted in FIG. 1.
FIG. 4 depicts, again in more detail, the routing system situated at the outlet of the box section depicted in FIG. 3.
FIG. 12 depicts an alternative embodiment of the lower part of the module that constitutes the conveyor device.
FIG. 13 depicts another embodiment of the lower part of the module, specially designed to accept orientated caps arriving simply under gravity.

FIG. 3 shows, in greater detail, those parts of the preparation machine and of the box section (13) at which the caps (5) are ejected and at which they are taken up, respectively.

The box section (13) is fixed to the structure (2) of the preparation machine, at its upper part, on the downstream side, in the continuation of the grooves (7) of the belt (3), the latter being depicted in part.

On the upstream side of the belt (3) there are enough nozzles (10) that some of them can always be in action facing the grooves (7) in order to blow on the caps (5) and drive them toward the other side of said belt (3), the downstream side.

These nozzles (10) are arranged on the opposite side of the box section (13) with respect to the belt (3) and facing the inlet of the duct (15) which is formed in the wall (19) of said box section (13). This inlet to the duct (15) has a height which is in proportion with the rate of travel of the belt and with the rate at which the caps (5) are ejected from their grooves (7); this height is, for example, of the order of 2 to 3 times the diameter of said caps (5). This height allows an appreciable improvement in the rates at which the caps (5) can be delivered.

In order to be able to accommodate the caps (5) as soon as they have been ejected from their grooves (7), the duct (15) of the box section (13) has a width which also corresponds at least to twice the diameter of said caps. This duct (15) consists of the walls (16) and (17) mentioned earlier with reference to FIGS. 1 and 2, and of two other side walls which constitute curved guides, in the shape of arcs of a circle: an extrados guide (20) which extends between the inlet and the outlet of the box section (13), and an intrados guide (21), the length of which is markedly shorter, so as to leave a passage at each of its ends so that the caps (5) which have been unable to enter the neck (22) arranged at the downstream end of said duct (15) can be recycled.

The neck (22) situated at the outlet of the box section (13) constitutes the start of the duct (18) of the column (14) which will be detailed later on. This neck (22) collects all the caps which are guided by the extrados (20). It is delimited by the downstream end portion of this extrados (20) and by another wedge-shaped guide (23) which is relatively short, of the order of one to two times the diameter of the caps (5).

The wedge (23) consists of a wall (24) which is parallel to the end of the extrados (20) and of a wall (25) which is curved and joined to the top wall (26) of the box section (13) to send the caps (5) back toward the inlet of the latter as explained hereinafter.

The ridge (27) of the wedge (23) forms a kind of switchblade routing device at the inlet to the neck (22) and comprises a separator member which consists of a microroller (28) against which the caps (5) arriving in a second succession at the inlet to said neck (22) butt. The axle of this microroller (28) consists of a simple metal rod trapped between the two walls (16) and (17) that form the duct (15) of the box section (13).

The neck (22) has a width slightly greater than the diameter of the caps so as to place these caps in single file before they enter the duct (18) of the routing conveyor that is in the form of a column (14).

The caps (5) which do not reach the inlet of the neck (22) are recycled, that is to say travel around the intrados guide (21) and then, as soon as possible, reposition themselves in the succession circulating along the extrados guide (20), which succession, given the random way in which the grooves (7) are filled, is not always a continuous succession.

The intrados guide (21) is completed, on the opposite side to the duct (15), by a wall (29) so as to guide the recycled caps back toward the inlet of said duct and make it easier for them to become reintegrated into the succession circulating along the extrados guide (20). This intrados guide (21) and the wall (29) form a kind of island (30) in the heart of the box section (13) between the inlet of said box section and the inlet of the neck (22), and the thickness of this island (30) more or less corresponds to that of the caps (5).

The caps are conveyed in the module (12), that is to say in the intermediate conveyor consisting of the box section (13) and the routing conveyor consisting of the column (14) by blown air supplied by a blower (31) installed under said box section (13).

The box section (13) and the column (14) each comprise a chamber; these chambers communicate with one another and are kept under pressure by the blower (31) for supplying orifices in the form of louvers (32). The pressure maintained in these chambers is of the order of 1500 Pa.

The louvers (32) are fashioned in the wall (16) of the box section (13) and orientated in such a way as to cause the caps to progress downstream, that is to say toward the end of the column (14) as soon as they leave the grooves (7) in the belt (3).

These louvers (32) are clearly visible in FIG. 4 and are depicted in perspective in FIG. 7. They are arranged in a row from the inlet of the box section (13) and extend continuously over the entire length of the duct which acts as a guide for the caps.

In the duct (18) of the column (14) there are two rows of louvers (32) which are mutually parallel, whereas in the duct (15) of the box section (13) the number of rows is greater. This number of rows of louvers in the duct (15) is tailored to suit the height of the inlet of the box section (13). There may, for example, be four rows of louvers (32) as depicted in the figure for taking up the caps which enter the box section (13) and driving them toward the column (14).

The module (12) which is made up of this column (14) and of the box section (13) makes it possible thus to have continuity between the phase in which the caps (5) are ejected from the belt (3) and their carriage to the station where these caps are used. This continuity means that high user station speed rates can be achieved.

In the case of the preparation machine depicted in FIG. 1, this continuity begins actually at the inlet to the box section (13), at the point where the caps (5) leave the belt (3) to be taken up by the stream of fluid, for example air, leaving the louvers (32). The wall (16) in which the these louvers (32) are fashioned is in the continuation of the belt (3); the surface of this belt (3), which acts as a guide for the caps (5), lies in the plane of the surface equipped with louvers (32) of the box section (13).

The module (12) which is depicted in FIG. 5, associated with a preparation machine identical to that of FIG. 1, also comprises a column (14) which is borne by another type of box section; this box section (33) additionally extends over the entire width of the belt (3).

In this embodiment depicted in FIG. 5, cap ejection and take-up are operations which are performed continuously at the box section (33). The means for ejecting the caps act on the latter from the upstream part of the belt (3), and even a little beyond, possibly, as depicted in fine chain line in FIG. 6, by virtue of a special lateral extension (33') which may have the same effect as the linear array of nozzles (10) discussed earlier. In effect, in order to rapidly set in motion the caps which lie at the downstream end of the grooves (7), it may be beneficial to position air jets, either in the form of nozzles like the nozzles (10) of the embodiment of FIG. 1, or simply in the form of louvers (32) by extending the box section over the belt (3).

The stream of blown air needed here also for ejecting the orientated caps is also produced by a blower (31); the outlet (34) from this blower (31) is positioned on the box section (33) and preferably lies within the footprint of the belt (3) of the preparation machine.

The stream of blown air is first of all introduced into the chamber of the box section (33) and then flows into the chamber of the column (14) which constitutes an extension of that of the said box section (33). The pressure of the air in these chambers is also of the order of 1500 Pa.

Part of the box section (33) masks the upper, part of the belt (3); the remainder of said box section protrudes laterally, on the downstream side, to support the column (14). The wall of the box section (33) which lies on the same side as the belt (3) is visible in FIG. 6. This wall (36) comprises a part which masks the belt (3), forming a kind of screen, so as to close off the grooves (7) in said belt (3); the other part of this wall (36) lies on the side of said belt, (3); it ensures the continuity between the latter and the column (14) and is also closed off by walls which form a duct, details of which will be given later.

As depicted in FIG. 6, the wall (36) also, like the wall (16) of the box section (13), comprises a multitude of louvers (32). These louvers (32) form small jets of air directed downstream, as depicted in greater detail in FIG. 7. In all instances, these louvers (32) are obtained simply by cutting and pressing in the walls in which they are fashioned, both in the wall of the various box sections and in the wall(s) of the column (14).

FIG. 6 shows the ejection and conveying module (12) in a configuration which allows it to be fitted to a preparation machine and, in particular, to be fitted to the upper part of the belt (3). This module (12) may be fixed to the structure (2) of the machine, on either side of the belt (3), by means of clamps or other practical assembly means such as lugs (37) for example.

The wall (36) of the box section (33) comprises two zones: the ejection zone (8) that corresponds to the ejection of the caps (5), which zone covers the belt (3) and extends between the lugs (37) of said box section (33), and the take-up and conveying zone (38), which zone (38) constitutes the intermediate conveyor of the module (12) and extends between said belt (3) and the inlet of the routing conveyor consisting of the column (14) of said module (12).

The zone (38) comprises a duct (39) which constitutes the extension of the grooves (7) of the belt (3). This duct (39) is delimited by the wall (36), by lateral guides (40) and (41) and by a wall (42), depicted in part, which is parallel to said wall (36). This wall (42), which may be translucent, lies in the plane of the belt (3), in the continuity of the latter to ensure the continuity with which the caps (5) are guided as soon as they leave said belt (3).

It can be seen from FIG. 6 that the inlet to the intermediate conveyor of the zone (38) is in the shape of a Vee. This inlet in fact lies facing the outlet of the grooves (7) of the belt (3) so that the orientated caps (5) can be taken up as soon as they are ejected from said grooves (7). The opening of this Vee, on the same side as the belt (3), is of the order of 1.5 times the diameter of the caps (5).

The lower side of the Vee consists of the guide (40) which extends as far as the belt (3), while the upper side consists of the guide (41).

FIG. 6 clearly shows the continuity there is between the ejection zone (8) and the zone (38) where the caps (5) are taken up. This continuity results from the presence of the rows of louvers (32) with, preferably, as depicted in the figures, two main rows (44) which constitute the main ejection rows. These main rows (44) extend from the upstream part of the box section (33) as far as the downstream end of the column (14).

According to the rate of travel of the belt (3), the wall (36) may comprise several additional rows of louvers to facilitate ejection of the caps from their grooves (7): one additional row (45) situated above the main rows (44), and one or more additional rows (46) situated below said main rows (44) to concentrate the caps toward the downstream end of the belt (3).

Figures 8, 9, 10:
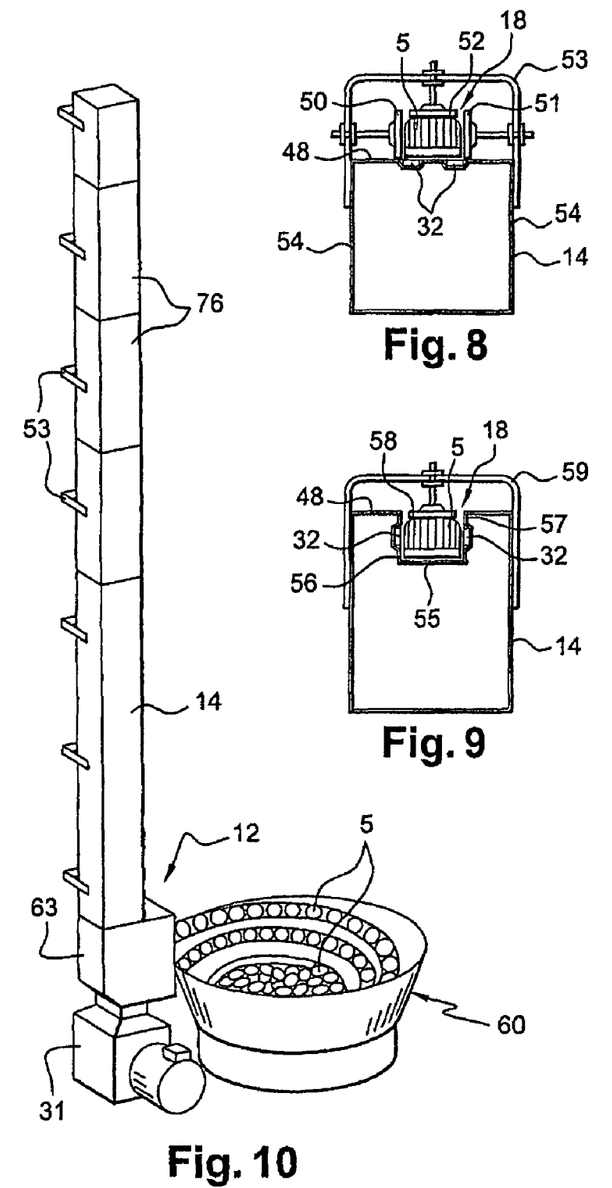
FIG. 8 is a section of the column of the conveyor device.
FIG. 9 is a section of an alternative embodiment of the column of the conveyor device.
FIG. 10 shows a preparation machine of the vibrating bowl type associated with a conveyor device according to the invention.

FIGS. 8 and 9 show a section through the column (14) and, in particular, through the duct (18) that guides the caps (5). This duct (18) is open to allow the blown air leaving the louvers (32) to escape. These louvers (32) are fashioned in the apron (48), FIG. 8, in one or more rows and, in this embodiment of said FIG. 8, the duct (18) consists of a pair of lateral guides (50) and (51) and of an upper guide (52). These guides (50, 51 and 52) are borne by structures in the form of brackets (53) and these brackets are secured to the walls of the column (14) and uniformly distributed thereon.

The position of the various guides (50, 51 and 52) can be adjusted so that the dimensions of the duct can be adapted to suit those of the caps (5) to be conveyed, making it possible to have a somewhat standard form of column (14) that can be readily adapted to suit all kinds of preparation machine.

FIG. 9 shows an alternative embodiment of the duct (18). This duct (18) is in fact fashioned directly, through bending operations, in the wall which comprises the louvers (32), that is to say in the apron (48); it is in the form of a groove included in the chamber of the column (14), which groove is delimited by a bottom (55) and two side walls (56) and (57) arranged facing one another and comprising the louvers (32). An adjustable upper guide (58) is borne by brackets (59) which are secured to the side walls of the column (14), as before, and which are uniformly distributed over the entire height of said column (14).

FIG. 10 shows an alternative way of using the module (12). This module (12) is associated with a preparation machine of the type consisting of a vibrating bowl (60). This bowl (60) contains caps (5) and, like belt-type preparation machines, orientates said caps (5) which are then taken up by the module (12) as described previously.

Figure 11:
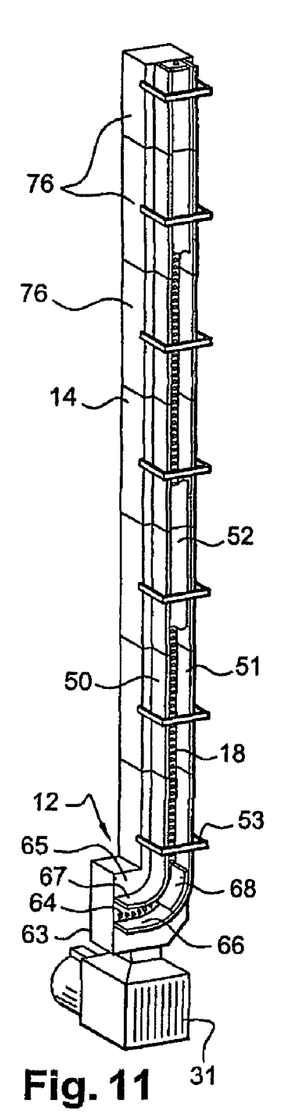
FIG. 11 shows, in isolation, the conveyor device of FIG. 10, alone, viewed from the driving louvers side.

This module (12), also depicted in FIG. 11, comprises a box section (63) which is surmounted by a column (14), which column is identical to the columns depicted before, particularly in FIGS. 1 and 5. The box section (63) and the column (14) are supplied with pressurized air in the same way by means of a blower (31).

As they leave the bowl (60) the caps (5) are taken up and guided in the duct (64) of the box section (63); this duct (64) is delimited by the wall (65) of said box section (63), by lateral guides (66), (67) and by a guide (68) which is parallel to said wall (65), which guides (66, 67 and 68) lie respectively in the continuation of the respective guides (50, 51 and 52) which form the duct (18) of the column (14) according to the embodiment of FIG. 8.

The wall (65) also comprises two rows of louvers (32) which extend into the apron (48) of the column (14).

FIG. 12 shows a box section (73) which constitutes an alternative to the box sections described hereinabove. This box section (73) is supplied from the side with pressurized air by a blower, the outlet (34) of which is depicted and it comprises, at its upstream part, facing the duct (15), a conveyor portion (72) of the same type as the vertical column (14); this portion (72) is configured in such a way as to provide, in certain configurations, the junction with the preparation machine.

FIG. 13 shows an alternative embodiment of the box section (73) of FIG. 12. This box section is configured to receive caps via an orifice (74) situated at its upper part. The preparation machine is associated with this box section (13) by means of a duct (75) which makes the junction between where the caps (5) leave said machine and the inlet to said box section (73).

The box section depicted in FIG. 12 and FIG. 13 is able to receive caps from a preparation machine of the vibrating bowl or some other type and to drive said caps, using a stream of fluid, toward the outlet positioned under the column (14).

The preparation machine rigged with its module (12) is able to respond to all installation requirements on a bottling site, for example, and is so by virtue, in particular, of the possibility of adjusting the height H of the column (14).

This possibility of adjusting the height H results from the design of this column (14) which is split into sections (76), these sections (76) being of a height that may be standardized, for example of the order of 60 cm.

The preparation machine too, with its module (12) which takes on the routing of the caps (5), becomes a kind of standard component; the belt (3) of said machine is confined to its essential function which is that of orientating the caps and routing them to the ejection means detailed hereinabove.

The invention claimed is:

1. A conveyor device for routing orientated objects, said conveyor device configured to be associated with a preparation machine having a belt or a vibrating bowl, said conveyor device comprising:

a module comprising:
- a vertical conveyor comprising sections, which make a height of the vertical conveyor adjustable,
- an intermediate conveyor which comprises a conveying zone for the orientated objects, the conveying zone placing the objects in a single file before the objects enter the vertical conveyor,
- a duct for guiding the objects through the intermediate conveyor and through the vertical conveyor, and
- at least one nozzle which provides a jet of fluid for propelling the objects,
- wherein the intermediate conveyor is interposed between the preparation machine and the vertical conveyor, such that the intermediate conveyor supports the vertical conveyor, and wherein the duct forms a continuous track running between an exit of the preparation machine and an upper end of the vertical conveyor, wherein the nozzles are in the form of louvers arranged on at least one wall of the duct, wherein the louvers communicate with chambers of the intermediate conveyor and of the vertical conveyor, and wherein the chambers are supplied with pressurized fluid by a blower.

2. The conveyor device as claimed in claim 1, wherein the intermediate conveyor houses a portion of the duct and comprises at least one row of louvers, and
- wherein the portion of the duct housed in the intermediate conveyor has a shape of a curve, said curved portion extending between the exit of the preparation machine and the vertical conveyor, such that the curved portion is positioned beneath the vertical conveyor.

3. The conveyor device as claimed in claim 2, wherein the portion of the duct housed in the intermediate conveyor has a width which exceeds a width of a portion of the duct housed within the vertical conveyor, and further has a inlet having a width which correspond to at least twice a diameter of the objects,
- wherein the portion of the duct housed in the intermediate conveyor comprises:
  - a wall with the louvers disposed thereon,
  - a wall spaced away from the wall with the louvers by a distance which corresponds to at least a thickness of the objects,
  - an extrados guide which runs between an inlet and an outlet of the intermediate conveyor, and
  - an intrados guide having ends sufficiently distanced from the inlet and from the outlet of the intermediate conveyor, such that the objects which are not disposed in a row of objects circulating against the extrados guide are recycled to the inlet of the intermediate conveyor.

4. The conveyor device as claimed in claim 3, wherein, at a downstream end of the portion of the duct housed in the intermediate conveyor, a neck is delimited by an end of the extrados guide and a wedge-shaped separation device, wherein the wedge shaped separation device comprises, a ridge, and a microroller, which moves aside the recycled objects, and causes the recycled objects to pass around the intrados guide, wherein the intrados guide is supplemented by a wall so as to form an island in the middle of said intermediate conveyor around which the recycled objects circulate.

5. The conveyor device as claimed in claim 2, wherein an inlet of the portion of the duct housed in the intermediate conveyor, has a V shape, an opening of which is directed toward the exit of the preparation machine, wherein said V is designed to receive the objects as they are ejected from said preparation machine, wherein the opening has a dimension shorter than twice the diameter of the objects.

6. The conveyor device as claimed in claim 1, wherein the preparation machine comprises a belt having at least one groove, and
- the blower supplies fluid which ejects the objects from the at least one groove in the belt.

7. The conveyor device as claimed in claim 6, wherein the fluid is supplied to eject the objects through a linear array of nozzles situated on an upstream side of the belt of the preparation machine, opposing an inlet of the intermediate conveyor, such that the linear array of nozzles face the inlet to said intermediate conveyor,
- wherein the linear array of nozzles are supplied with a stream of pressurized fluid by the blower, and blow the fluid into the grooves of the belt, wherein the grooves are closed off by a portion of a wall of the intermediate conveyor,
- wherein the wall of the intermediate conveyor which covers grooves is equipped with louvers, and extends over several grooves, and in particular extends at a height which corresponds at least to a combined height of the grooves from which the objects are ejected.

8. The conveyor device as claimed in claim 6, wherein a portion of a wall of the intermediate conveyor is extended to cover a portion of the belt of preparation machine at an upper section of the belt, and
- wherein the wall of the intermediate conveyor which covers the portion of the belt covers grooves of the belt and comprises louvers which blow fluid on the objects positioned in the grooves and drive the objects into a portion of the duct housed by said intermediate conveyor.

9. The conveyor device as claimed in claim 1, wherein the at least one section of the vertical conveyor has a length which adapts the vertical conveyor to installation constraints on a site of the preparation machine.

10. The conveyor device as claimed in claim 1, wherein the vertical conveyor houses a portion of the duct, and
- the portion of the duct housed by the vertical conveyor comprises:
  - an apron equipped with louvers which are arranged in one or more rows, and
  - two lateral guides and a guide parallel to the apron,
- wherein each of the lateral guides and the guide parallel to the apron are borne by brackets uniformly distributed over an exterior of the vertical conveyor and include a positioning mechanism which adjusts the guides.

11. The conveyor device as claimed in claim 1, wherein the vertical conveyor houses a portion of the duct, and has an apron bearing louvers, and
- wherein said duct comprises, obtained by bending, a bottom wall and side walls, and a guide parallel to said bottom wall,
- wherein the guide is borne by brackets, which adjusts a position of the guide relative to the bottom wall, and
- wherein louvers are arranged in the side walls of the duct.

12. The conveyor device as claimed in claim 1, wherein the blower supplies the chambers of the intermediate conveyor and of the vertical conveyor with pressurized fluid, the blower being tailored to a number of louvers to be supplied with pressurized fluid and to a pressure to be maintained in said chambers.

13. The conveyor device as claimed in claim 8, wherein, the wall of the intermediate conveyor which is equipped with the louvers comprises several rows of louvers including:

at least one main row of louvers for ejecting and conveying the objects, which extends over an entire length of the wall;

at least one additional row of louvers situated above the at least one main row of louvers and which extends over the entire width of the belt; and at least one additional row of louvers which is situated under the at least one main row and extends also over the entire width of the belt to gather the ejected objects back together and force the objects to regroup at a downstream edge of the belt.

14. The conveyor device as claimed in claim 1, wherein the blower supplies the louvers with blown fluid, the blower being positioned under the intermediate conveyor.

15. The conveyor device as claimed in claim 1, wherein the blower supplies the louvers with blown fluid, the blower being arranged directly on the intermediate conveyor within a footprint of the preparation machine.

16. The conveyor device as claim 1, wherein a portion of the duct housed in the intermediate conveyor, at an upstream section, has a corresponding form as a portion of the duct housed within the vertical conveyor, designed to provide a junction with the portion of the duct housed within the vertical conveyor.

17. The conveyor device as claimed in claim 1, wherein the intermediate conveyor, comprises an orifice at an upstream part which is vertically aligned with an inlet of a portion of the duct housed within the intermediate conveyor, wherein objects drop simply under gravity from the preparation machine, which the preparation machine is connected to the intermediate conveyor by a channel which maintains the orientation of said objects.

18. A preparation machine for objects, comprising one of a belt or a vibrating bowl, and further comprising a conveyor device comprising:
a module comprising:
a vertical conveyor comprising sections, which make a height of the vertical conveyor,
an intermediate conveyor which comprises a conveying zone for the orientated objects to place the objects in single file before the objects enter the vertical conveyor,
wherein the intermediate conveyor is interposed between the preparation machine and the vertical conveyor, and the intermediate conveyor supports the vertical conveyor,
a duct for guiding the objects through the intermediate conveyor and through the vertical conveyor, and
at least one nozzle which provides a jet of fluid for propelling the objects,
wherein the duct forms a continuous track running between the preparation machine and the upper end of the vertical conveyor, said continuous track comprising the at least one nozzle for propelling the object,
wherein the at least one nozzle has the form of louvers arranged on at least one of the walls of the duct and on at least one wall of the conveyor device,
wherein the louvers communicate with chambers of the intermediate conveyor and of the vertical conveyor,
wherein the chambers are supplied with pressurized fluid, and
wherein the conveyor device routes the objects to the upper end of the vertical conveyor of the conveyor device,
such that said preparation machine, and the conveyor device forms an actual product that can be incorporated into a bottling line.

19. The conveyor device as claimed in claim 1, wherein the orientated objects are one of closures, lids, and caps.

20. The conveyor device as claimed in claim 1, wherein the intermediate conveyor is formed as a box.

21. The conveyor device as claimed in claim 1, wherein the objects are guided through the intermediate conveyor and the vertical conveyor using the same propellant.

* * * * *